United States Patent [19]

Ishihara et al.

[11] Patent Number: 5,397,511
[45] Date of Patent: Mar. 14, 1995

[54] METHOD OF PRODUCING INTRAOCULAR LENS FORMED FROM POLYIMIDE POWDER

[75] Inventors: Kenichi Ishihara, Kasugai; Kazuhiko Nakada, Aichi; Kunihisa Yoshida, Aichi; Haruyuki Hiratani, Aichi, all of Japan

[73] Assignee: Menicon Co., Ltd., Japan

[21] Appl. No.: 131,393

[22] Filed: Oct. 5, 1993

[30] Foreign Application Priority Data

Oct. 7, 1992 [JP] Japan .................................. 4-293849
Aug. 23, 1993 [JP] Japan .................................. 5-207596

[51] Int. Cl.$^6$ ............................................. B29D 11/00
[52] U.S. Cl. ..................................... 264/1.37; 264/1.7; 264/2.7; 264/162; 264/235; 264/319; 264/325
[58] Field of Search ................. 264/1.7, 2.7, 162, 319, 264/325, 346, 348, 235, 237, 1-4, 25; 425/808

[56] References Cited

U.S. PATENT DOCUMENTS 4,876,330 10/1989 Higashi et al. ...................... 528/353
5,141,677 8/1992 Fogarty ................................ 264/2.3

FOREIGN PATENT DOCUMENTS 0345810 12/1989 European Pat. Off. .
0426088 5/1991 European Pat. Off. .
36 07 584 9/1986 Germany .
60-49906 3/1985 Japan .
1192617 5/1970 United Kingdom .

Primary Examiner—Mathieu D. Vargot
Attorney, Agent, or Firm—Parkhurst, Wendel & Rossi

[57] ABSTRACT

A method of producing an intraocular lens having integrally formed optic and haptic including the steps of: (a) preparing a polyimide powder having a repeated unit represented by the following formula:

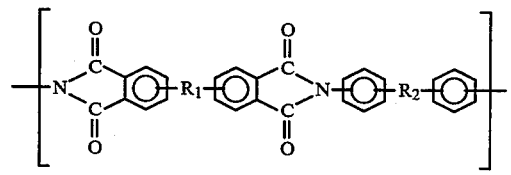

[in the formula, when $R_1 = -C(CF_3)_2-$, $R_2$ is selected from $-SO_2-$, $-O-$,

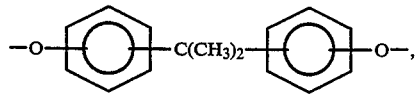

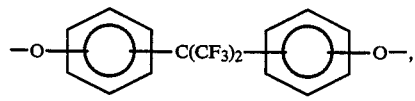

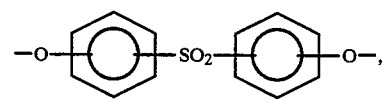

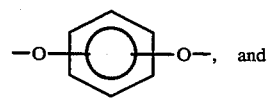 , and

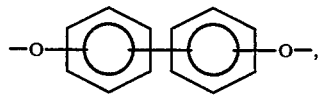

, and when $R_1 = -SO_2-$ or $-O-$, $R_2$ is $-C(CF_3)_2-$ or 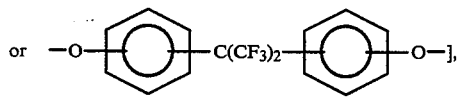 ], the polyimide powder having a particle size of less than 1 mm; (b) placing the polyimide powder between a pair of dies having a pattern corresponding to a part of the contour of the lens; (c) hot pressing the polyimide powder between the dies, to provide a molding having the above part of the contour of the lens; and (d) machining the molding to form the rest of the contour of the lens to thereby provide the overall shape of the intraocular lens.

29 Claims, 7 Drawing Sheets

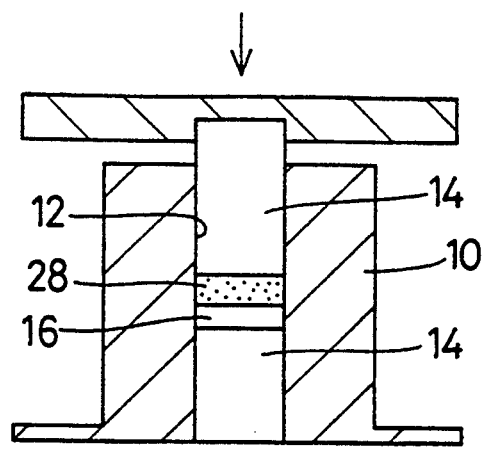
FIG. 1
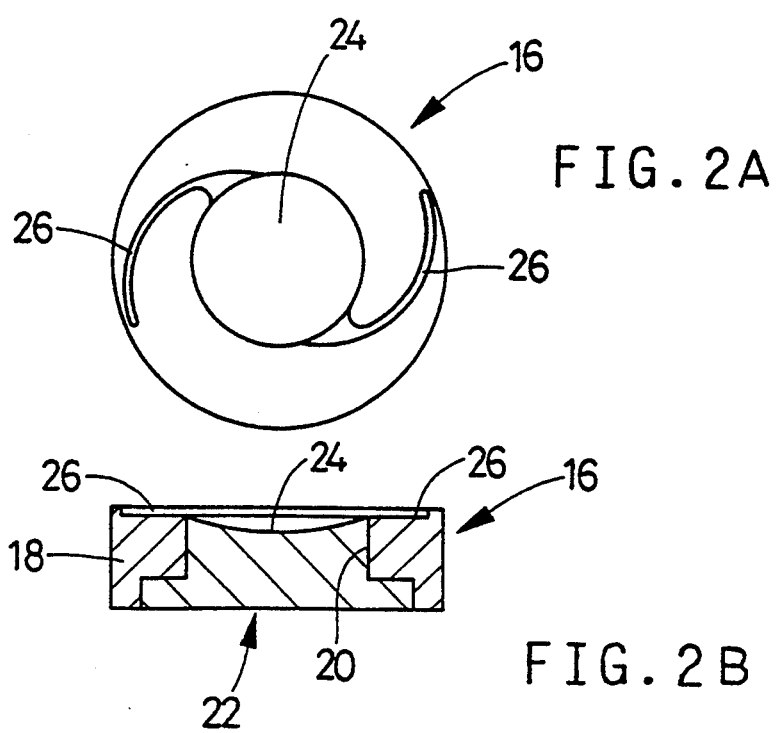
FIG. 2A
FIG. 2B

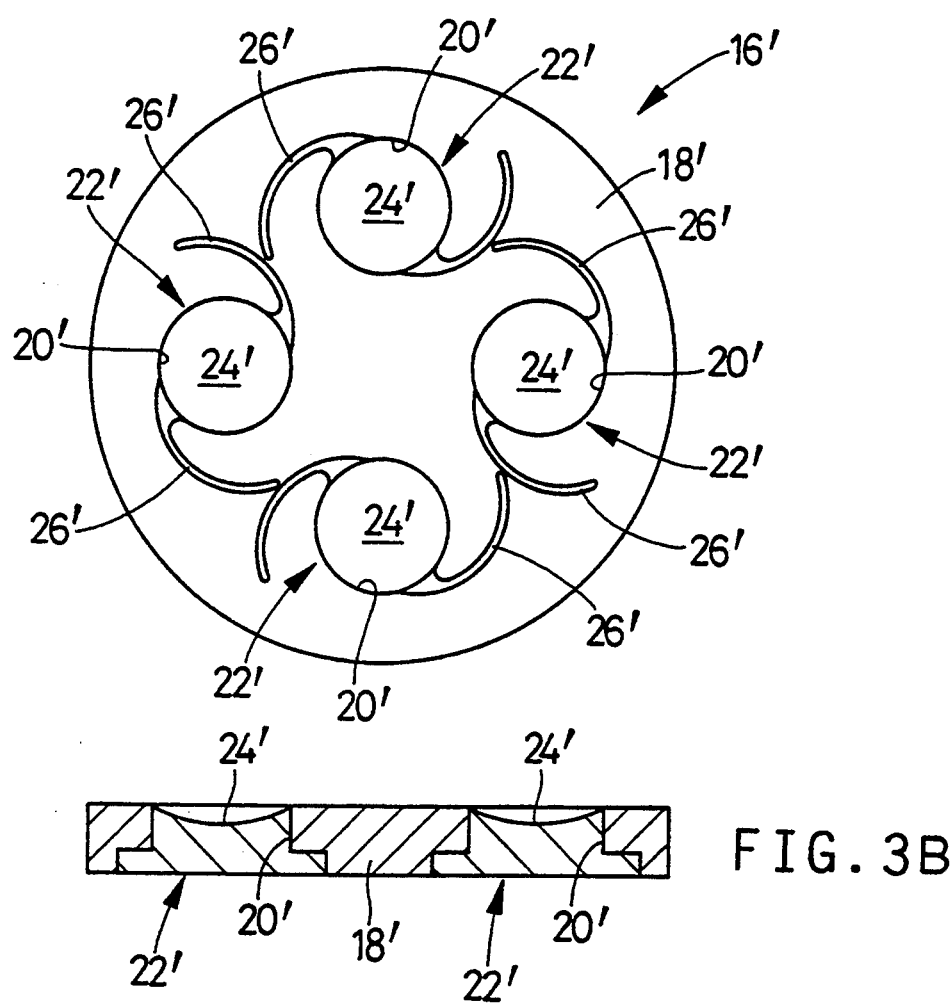

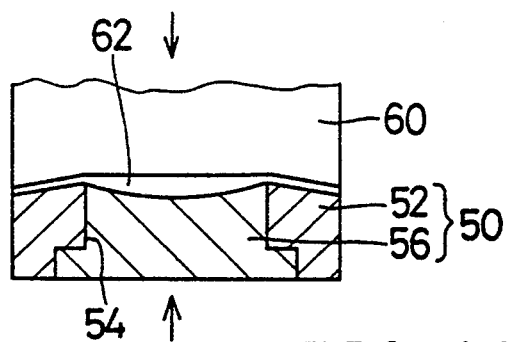
FIG. 10
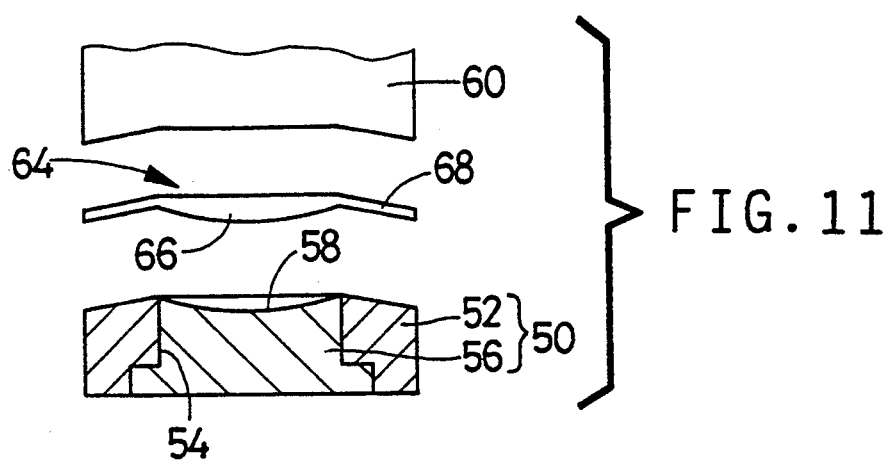
FIG. 11
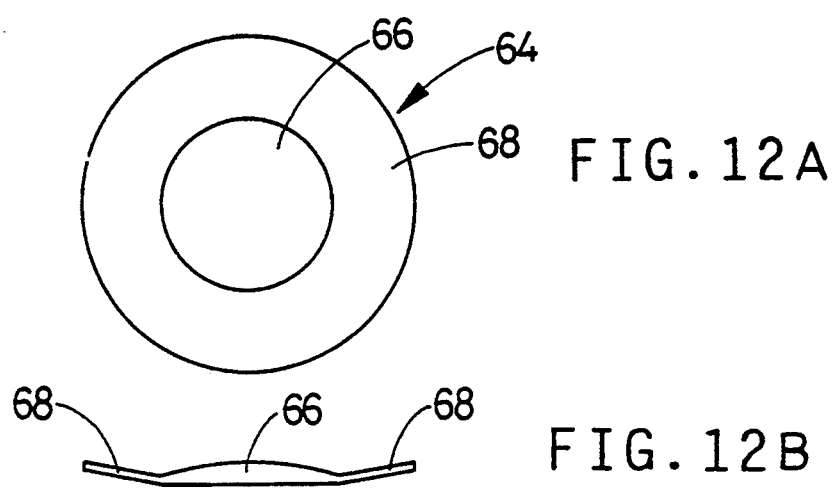
FIG. 12A
FIG. 12B

METHOD OF PRODUCING INTRAOCULAR LENS FORMED FROM POLYIMIDE POWDER

BACKGROUND OF THE INVENTION

1. Field of the Invention

The present invention relates in general to a method of producing an intraocular lens which is made of a polyimide material and has good transparency and excellent optical properties. In particular, the invention is concerned with a method of producing a one-piece type intraocular lens consisting of integrally formed optic and haptic, which method permits quantity production of such one-piece type intraocular lenses at a low cost.

2. Discussion of the Related Art

Conventionally, there are known two-piece or three-piece type intraocular lenses produced by assembling or fixing together an optical member and a support member which are prepared independently of each other. Also known are one-piece type intraocular lenses each having an optic and a haptic formed integrally with the optic. The haptic or other support member serves to hold the lens in position within the eye. At present, the one-piece type intraocular lenses are preferably used since they can be manufactured with an improved efficiency.

In fact, the known one-piece type intraocular lenses have been produced only by mechanical processing such as cutting and polishing. To form a lens having a convex surface and a planar surface as opposite lens surfaces, for example, a disc-like lens blank made of a suitable material (hereinafter referred to as "molding material") is initially embossed at its one surface with an optic and a haptic of the lens to be formed, and the optic is then cut and polished to thereby provide a suitably curved lens surface. Thereafter, with this curved surface bonded to and securely held by a suitable jig or fixture, the other surface of the lens blank is subjected to plane cutting, and remaining portions of the lens blank are then removed off. After the thus cut surface is polished, the jig is removed and a desired intraocular lens is obtained. This method, however, is disadvantageous in its extraordinary cumbersome and time-consuming process steps. Further, an undesirably large amount of the molding material is wasted for the production of the lens according to the above method, thus resulting in reduced production efficiency and increased cost for manufacturing such lenses.

Another method of producing an integrally formed intraocular lens is disclosed in U.S. Pat. No. 5,141,677, in which a sheet made of polymethylmethacrylate (PMMA) is stamped under a pressure at an elevated temperature, using a suitable die. While this method may be applied to intraocular lenses made of PMMA as a conventional IOL material, the same method is not suitable for producing intraocular lenses made of polyimide materials which are highly expected as a favorable IOL material in these years. This is because the polyimide materials have a relatively high molding temperature, and exhibit poor flowability upon fusing thereof, which results in poor formability (moldability). Further, the polyimide materials tend to be colored due to heat applied upon molding thereof, and also suffer from optical strains and other problems. Although the production efficiency should be further improved, that is, the use of relatively expensive polyimide materials should be limited, so as to obtain the intraocular lenses at a reduced cost, the above-indicated U.S. Patent does not provide any suggestions for meeting this requirement.

SUMMARY OF THE INVENTION

It is therefore an object of the present invention to provide a method of producing an integrally formed intraocular lens made of a polyimide material, which permits quantity production thereof at a reduced cost, and which is transparent, free of optical strains and excellent in its optical properties.

The above object may be attained according to one aspect of the present invention, which provides a method of producing an intraocular lens having an optic, and a haptic for holding the lens in position within an eye, the optic and the haptic being formed integrally with each other, comprising the steps of: preparing a polyimide powder having a repeated unit represented by the following formula:

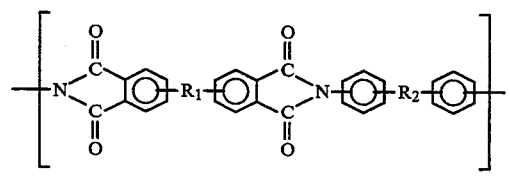

[in the formula, when $R_1 = -C(CF_3)_2-$, $R_2$ is selected from

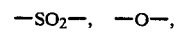

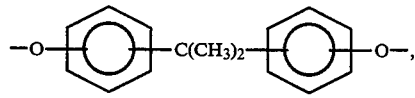

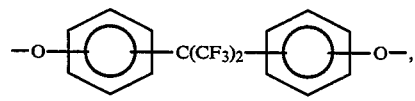

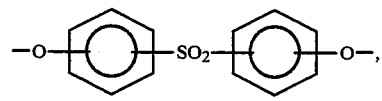

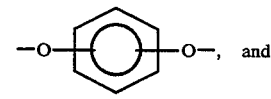, and

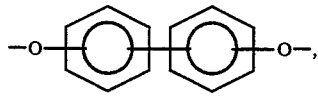

and when $R_1 = -SO_2-$ or $-O-$, $R_2$ is $-C(CF_3)_2-$ or 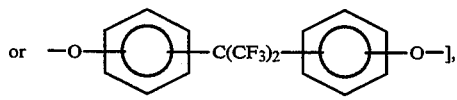], the polyimide powder having a particle size of less than 1 mm; placing a polyimide material consisting of the polyimide powder between a pair of dies having opposed molding surfaces, one of which has an engraved pattern corresponding to a contour of one surface of the optic of the intraocular lens and a contour of one surface of the haptic of the lens; hot pressing the polyimide material between the pair of dies, to provide a molding having a base plate, and a first and a second embossed portion formed on the base plate, the first embossed portion and the second embossed portion being configured to provide the one surface of the optic and the one surface of the haptic, respectively; and machining the molding so as to remove the base plate, to thereby form a surface opposite to the one surface of the optic and the one surface of the haptic, which surface cooperates with the first and second embossed portions to provide an overall shape of the intraocular lens.

The above object may be attained according to another aspect of the present invention, which provides a method of producing an intraocular lens having an optic, and a haptic for holding the lens in position within an eye, the optic and the haptic being formed integrally with each other, comprising the steps of: preparing a polyimide powder having a repeated unit represented by the above-indicated formula, the polyimide powder having a particle size of less than 1 mm; placing a polyimide material consisting of the polyimide powder between a pair of dies having opposed molding surfaces, one of which has an engraved pattern corresponding to a contour of one surface of the optic of the intraocular lens and a contour of one surface of the haptic of the lens, and the other of which has an engraved pattern corresponding to a contour of the other surface of the optic of the lens; hot pressing the polyimide material between the pair of dies, to provide a molding having a base plate, a first and a second embossed portion formed on one surface of the base plate and configured to provide the one surface of the optic and the one surface of the haptic, respectively, and a third embossed portion formed on the other surface of the base plate and configured to provide the other surface of the optic; and machining the molding so as to remove a part of the base plate, so that the first and second embossed portions cooperates with the third embossed portion to provide an overall shape of the intraocular lens.

The above object may be also attained according to a further aspect of the present invention, which provides a method of producing an intraocular lens having an optic, and a haptic for holding the lens in position within an eye, the optic and the haptic being formed integrally with each other, comprising the steps of: preparing a polyimide powder having a repeated unit represented by the above-indicated formula, the polyimide powder having a particle size of less than 1 mm; placing a polyimide material consisting of the polyimide powder between a pair of dies having opposed molding surfaces, at least one of which has an engraved pattern corresponding to a contour of the optic of the intraocular lens; hot pressing the polyimide material between the pair of dies, to provide a molding having a central portion which gives the optic of the lens and an annular flange surrounding the central portion and having the same thickness as the haptic of the lens, the annular flange being formed integrally with the optic; and machining the molding so as to form the haptic of the lens out of the annular flange of the molding, to thereby provide an overall shape of the intraocular lens wherein the haptic extends integrally from the optic.

According to the methods of the present invention as described above, an integrally formed intraocular lens is formed of a polyimide material having the repeated unit represented by the above-indicated formula. Initially, the polyimide powder having a particle size of less than 1 mm, that is, the polyimide powder having no particles of 1 mm or larger size, is prepared, and a polyimide material consisting of the polyimide powder is hot pressed between a pair of dies having an engraved pattern corresponding to a part of the whole shape or contour of the intraocular lens to be produced. As a result of the hot press molding, there is obtained a molding which gives the intraocular lens in the end. Since the powdered polyimide material is effectively fused between the dies during the hot press molding as described above, the part of the contour of the lens formed in the die pattern is highly accurately imparted to the surface of the molding thus obtained. Further, since only a part of the contour of the lens is engraved in the die or dies, and only one surface or the thickness of the haptic of the lens is formed during the hot press molding, the intraocular lens can be produced with ease and improved efficiency. Subsequently, the molding is machined by cutting and polishing, for example, so that the remaining portion of the lens which has not been formed by the above hot press molding is formed by the machining operation.

According to the above-described methods, the polyimide material in the form of a powder having a particle size of less than 1 mm is used as the polyimide material. The thus powdered polyimide material can be uniformly fused in a relatively short time during the hot press molding, assuring sufficiently high transparency of the material. Accordingly, the intraocular lens produced according to the present method is transparent, free of optical strains and has excellent optical properties. Further, the present method includes the hot press molding operation in addition to the conventional machining operation such as cutting and polishing, whereby the workload and the time needed in the cutting step can be considerably reduced, resulting in a significantly improved efficiency in producing the lens. This permits quantity production of such intraocular lenses at a reduced cost. Furthermore, due to the hot press molding, the optic and at least a part of the haptic of the lens can be formed like a mirror with high accuracy. Moreover, the amount of the polyimide material that is wasted during the cutting step can be reduced, as compared with the conventional case, and the manufacturing cost for the lens is accordingly reduced.

BRIEF DESCRIPTION OF THE DRAWINGS

The above and optional objects, features and advantages of the present invention will be better understood by reading the following detailed description of its presently preferred embodiments, when considered in conjunction with the accompanying drawings, in which:

FIG. 1 is a cross sectional view showing one example of hot press device used for implementing the method of the present invention;

FIG. 2A and FIG. 2B are a plan view and a vertical cross sectional view, respectively, showing one example of a die which is installed in the hot press device of FIG. 1;

FIG. 3A and FIG. 3B are a plane view and a vertical cross sectional view, respectively, showing another example of the die;

FIG. 10 is a cross sectional view for explaining a process step in which a polyimide material is hot pressed against a die having an engraved pattern corresponding to only an optic of an intraocular lens;

FIG. 11 is a cross sectional view for explaining a process step in which a molding is removed from the die;

FIG. 12A and FIG. 12B are a plan view and a front view showing the molding obtained in the step of FIG. 11;

DETAILED DESCRIPTION OF THE INVENTION

Figure 4:
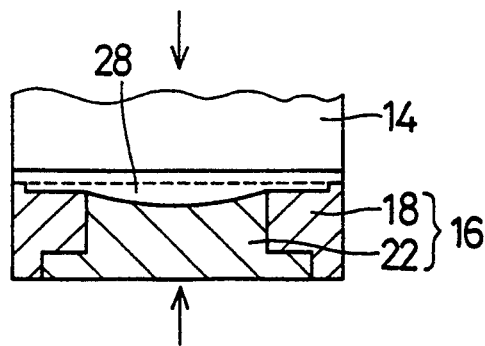
FIG. 4 is a cross sectional view for explaining a process step in which a polyimide material is hot pressed against the die as shown in FIG. 2.

The polyimide material (hereinafter referred to as "molding material") used according to the method of the present invention to give a desired intraocular lens has a repeated unit or polymerization unit represented by the following formula:

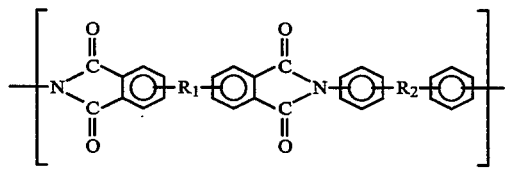

[in the formula, when $R_1 = -C(CF_3)_2-$, $R_2$ is selected from $-SO_2-$, $-O-$,

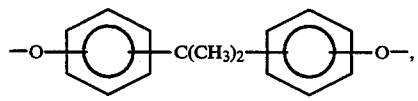

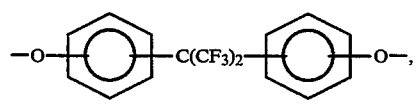

-continued

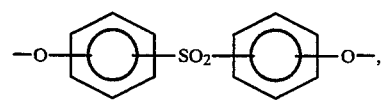

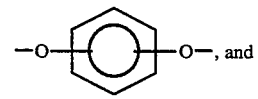

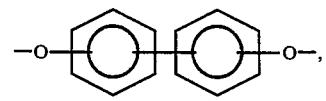

and when $R_1 = -SO_2-$ or $-O-$, $R_2$ is $-C(CF_3)_2-$ or

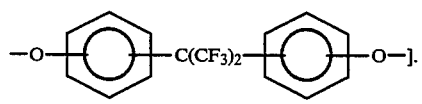

To attain the above object of the present invention, the polyimide molding material as indicated above is prepared as a powder having a particle size of less than 1 mm, preferably less than 0.5 mm. Namely, the powder does not include particles whose size is 1 mm or greater, preferably, 0.5 mm or greater. Since the powdered polyimide material has poor flowability upon fusing thereof, it is subjected to preliminary press molding as needed, prior to hot press molding for forming the desired intraocular lens. More specifically, the preliminary press molding is usually effected at a room temperature, at a pressure of 100~400 kgf/cm², for several tens of seconds to several tens of minutes. Then, the powdered polyimide material is subjected to hot press molding as described later. Where the particle size of the polyimide powder is smaller than 0.5 mm, in particular, strains are less likely to occur during the hot press molding, whereby a desired die pattern is transferred or imparted to the polyimide material with improved accuracy, thus making it unnecessary to remove the strains or effect the preliminary press molding. Without the preliminary press molding step, the intraocular lens made of the polyimide material can be produced with further improved efficiency. The powdered polyimide material can be obtained as needed by any one of known powdering methods which include a chemical method in which a polyimide solution is minutely dispersed in a poor solvent, and a physical or mechanical method using a mill such as a ball mill, tube mill, rod mill, roller mill, or pin mill.

Subsequently, according to the present method, the hot press molding is effected on the polyimide powder as the molding material, using a hot press device as illustrated in FIG. 1 by way of example. In the figure, reference numeral 10 denotes a cylindrical stationary base which is to be heated by a heating device (not shown). Within an inner bore 12 of the base 10, there are disposed a pair of upper and lower punches 14, 14 and a die 16 secured to the lower punch 14. In this hot press device, the upper surface of the die 16 and the lower surface of the upper punch 14 provide opposed molding surfaces of the device. That is, the die 16 and the upper punch 14 constitute a pair of dies for hot pressing the polyimide powder per se, or a mass of the polyimide powder 28 which has been preliminary pressed.

One example of the die 16 is illustrated in Figs. 2A and 2B. This die 16 consists of an annular body 18 having a center hole 20, and a disc-like die member 22 fixedly fitted in the center hole 20. The molding surface of the die member 22 has a spherical recess 24 which corresponds to the contour of one of the opposite lens surfaces of an optic of the intraocular lens to be formed. Further, the molding surface of the annular body 26 has two C-shaped grooves 26 formed adjacent the spherical recess 24, which grooves correspond to the contour of the corresponding surfaces of two haptics of the lens. Thus, the die 16 having the recess and grooves 24, 26 is used to form the contours of the corresponding surfaces of the optic and haptics of the intraocular lens on the mass of the polyimide powder 28.

Another example of die 16' is illustrated in FIGS. 3A and 3B, which has a plurality of recesses and grooves formed in its molding surface, which correspond to a plurality of intraocular lenses to be formed. More specifically, the die 16' has a circular body 18' having four circular holes 20' formed in equally spaced-apart relationship with each other in the circumferential direction of the die 16'. Four disc-like die members 22' are fixedly fitted in the respective holes 20'. Each of the die members 22' is formed with a spherical recess 24' for the optic of the lens, adjacent to which two C-shaped grooves 26' for the haptics of the lens are formed in the body 18'. By using the thus constructed die 16', four intraocular lenses are formed at the same time, assuring a significantly improved efficiency.

Generally, the die 16 and the punches 14 are formed of a material selected from a carbon steel, tool steels made of various alloys (including chromium, tin, silver, brass, antimony, bismuth or the like), glass, quartz, ceramic, and others. Among these materials, the carbon steel and the tool steels made of various alloys, which have high resistance to heat, are preferably used.

In the hot press device as described above, the mass of the polyimide powder 28 is placed between the upper punch 14 and the die 16. With the stationary base 10 heated, the upper punch 14 is pressed against the die 16 at a given molding pressure, so that the polyimide powder material 28 is fused, and desired shapes corresponding to the recess(es) 24 and grooves 26 formed in the die 16 are imparted to the surface of the polyimide powder material 28, as shown in FIG. 4.

More specifically, the hot press molding is effected under the following conditions. Initially, the molding temperature must be controlled to be higher than the temperature at which the molding material (the polyimide powder) is fused, so as to provide lens surfaces with good optical properties. If the molding temperature is too high, however, the molding material may be undesirably colored, or a resulting molding may stick to the die, thus making it difficult to remove the die from the mold. Accordingly, the molding temperature, which is determined depending upon the fusing temperature and glass transition temperature (Tg) of the polyimide material used as the molding material, is generally 110° C. ~ 160° C. higher than, preferably, 120° C. ~ 150° C. higher than the glass transition temperature (Tg) of the polyimide material.

If the molding pressure is low, the flowability of the molding material is deteriorated, making it difficult to provide a uniform molding. Accordingly, the molding pressure is preferably set to be not less than 100 kgf/cm$^2$, more preferably, not less than 150 kgf/cm$^2$. Generally, the molding pressure is held in a range of about 200 to 400 kgf/cm$^2$. Too high molding pressure is also undesirable since in such case the molding obtained may stick to the die, and it becomes difficult to remove the die from the molding after the molding process.

If the molding time is too short, the molding material does not fuse very well. On the other hand, the molding material tends to be colored or turned into yellow if it is kept heated for a long time. To obtain a lens surface having good optical properties, the molding time is generally held in a range of 5 min. to 40 min, and more specifically determined depending upon the thickness of the molding and other parameters. After the hot press molding, the molding is slowly cooled over a sufficiently long time, e.g., several tens of minutes, so as not to cause strains in the molding. However, it is undesirable to leave the molding at approximately room temperature, since it becomes difficult to remove the die from the mold.

Figure 5:
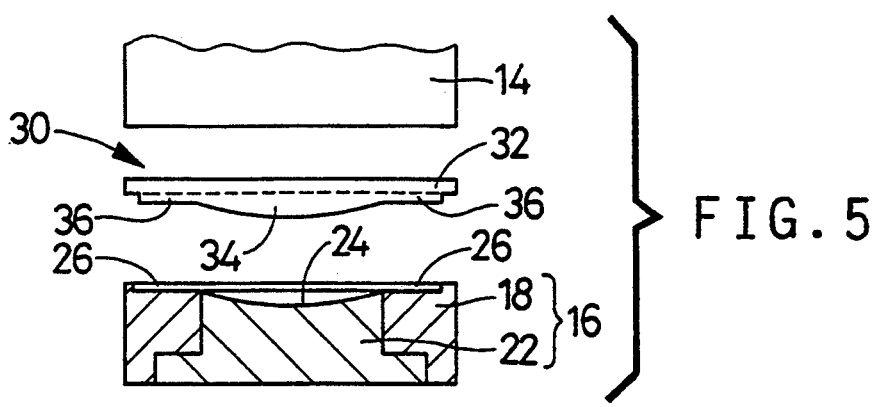
FIG. 5 is a cross sectional view for explaining a step in which a molding is removed from the die.
Figure 7:
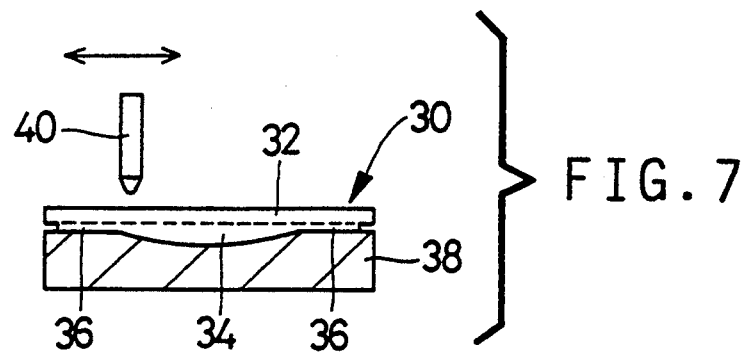
FIG. 7 is a cross section view for explaining a process step in which the molding of FIG. 6 is machined.

With the hot press molding effected in the above-described manner, the molding material 28 (polyimide powder) is processed into the molding 30, which is slowly cooled enough and then separated from the die 16, as shown in FIG. 5. After the slow cooling, the molding 30 is desirably subjected to heat treatment for removing strains in the molding 30. In the heat treatment, the molding 30 is held at a temperature between the glass transition temperature (Tg) and the fusing temperature of the molding material, preferably, at a temperature several tens of degrees higher than the glass transition temperature (Tg). The time duration for the heat treatment may be selected within a range of several tens of seconds to several hours, e.g., from about 30 minutes to two hours, though it is not limited to the range provided the strains in the molding can be removed. 10 The thus obtained molding 30 consists of a relatively thin base plate 32, a first embossed portion 34 which provides the above-indicated one surface of the optic of the intraocular lens to be formed, and a second embossed portion 36 which provides the corresponding surface of the haptic of the lens. In the next process step, the molding 30 is machined so that the base plate 32 is removed, while the embossed portions 34, 36 are bonded to and held by a jig 38, as shown in FIG. 7.

Figure 8:
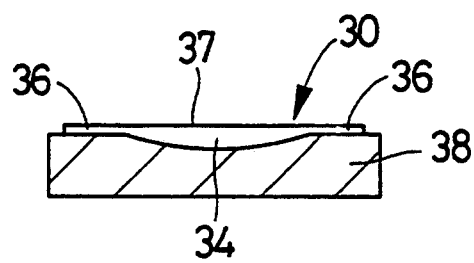
FIG. 8 is a cross sectional view showing the molding from which a base plate is removed by machining.
Figure 9A:
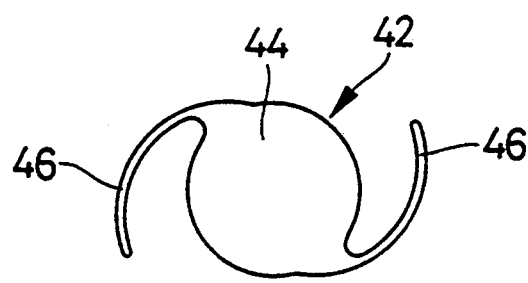
FIG. 9A and FIG. 9B are a plan view and a front view, respectively, showing an intraocular lens obtained from the molding of FIG. 8.
Figure 9B:
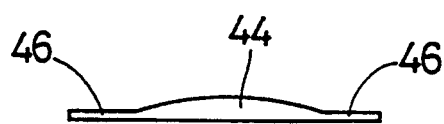
Figure 13:
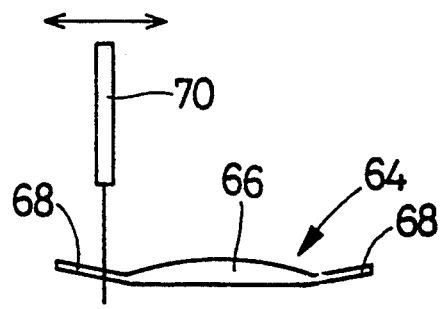
FIG. 13 is a cross sectional view for explaining a process step in which the molding of FIG. 12 is machined by a laser device.

In this machining step, a cutting tool 40, such as a diamond tool, is advantageously used for cutting and polishing the molding 30. As a result, the molding 30 is formed with a planar surface 37 as the other surface of the intraocular lens, which cooperates with the first and second embossed portions 34, 36 to provide the overall shape of the intraocular lens, as shown in FIG. 8. The thus obtained final product is then removed from the jig 38, to provide a plano-convex intraocular lens 42 as shown in FIGS. 9A and 9B, which consists of an optic 44 having a planar surface and a convex surface as its opposite lens surfaces, and C-shaped haptics 46, 46 formed integrally with the optic 44.

According to another embodiment of the method of the present invention, an intraocular lens is produced by using a die 50 as illustrated in FIGS. 10 and 11. Like the die 16 as described above, the die 50 consists of an annular body 52 having a center hole 54, and a disc-like die member 56 fixedly fitted in the center hole 54. This die 50 and a punch 60 constitute a pair of dies for hot pressing a polyimide powder material 62 interposed therebetween. The molding surface of the die member 56 has a spherical recess 58 corresponding to the contour of one of the opposite surfaces of an optic of the intraocular lens to be formed, and the molding surface of the annular body 52 is formed as a flat surface which is inclined slightly downwards toward the outer periphery of the body 52. That is, the body 52 does not have any grooves or recesses corresponding to the haptics of the intraocular lens. The punch 60 also has a radially outer portion which is inclined slightly downwards toward the outer periphery thereof.

When the hot press operation is effected with the polyimide powder material 62 disposed between the die 50 and the punch 60, the punch 60 is pressed against the die 50 so that the spacing between the die 50 and the punch 60 is commensurate with the desired thickness of the haptics of the intraocular lens to be formed. Generally, the spacing is held within a range of about 0.05 mm~0.3 mm. The thickness of the haptics is usually controlled by the molding pressure and the amount of the molding material used for the hot press operation. In this manner, a molding 64 as shown in FIGS. 12A and 12B is obtained, which consists of an optic 66 having a convex surface and a planar surface as opposite lens surfaces, and a relatively thin annular flange 68 formed integrally with the optic 66. This annular flange 68 has a thickness which is equal to the desired thickness of the haptics of the lens to be formed, and is inclined a suitable angle with respect to the optic 66.

The thus obtained molding 64 is machined in the next process step, so as to form the haptics of the intraocular lens out of the annular flange 68, such that the haptics extend as an integral part from the optic 66. In this machining step, a laser device 70, such as excimer laser, is used to remove unnecessary portions of the molding 64, so as to cut out the optic 66 of the molding 64 and form the haptics out of the annular flange 68. Thus, a desired intraocular lens similar to that shown in FIGS. 9A and 9B but having inclined haptics is obtained. This machining operation may also be effected by punching, or by hollowing with an engraving machine. Prior to the machining operation, one or both of the opposite surfaces of the optic of the intraocular lens may be slightly ground or polished as needed, so as to provide the lens with desired refractive optical power.

Figure 16:
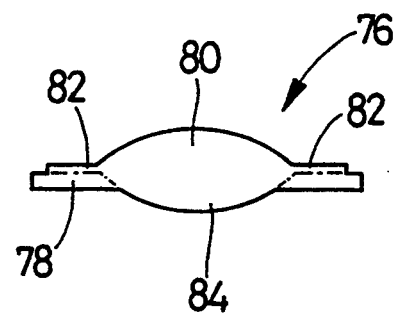
FIG. 16 is a front view showing an example of a molding formed according to another embodiment of the method of the present invention.

According to a further embodiment of the method of the present invention, the above-indicated polyimide powder material is hot pressed by a pair of dies having opposed engraved molding surfaces. The molding surface of one of the dies has an engraved pattern which corresponds to the contour of one surface of the optic of the intraocular lens and that of the corresponding surface of the haptics, and the molding surface of the other die has an engraved pattern which corresponds to the contour of the other surface of the optic of the lens and that of the other surface of the haptics. FIG. 16 shows one example of a molding 76 obtained by using such dies. The molding 76 includes a relatively thin base plate 78, a first embossed portion 80 which provides the one surface of the optic of the intraocular lens to be formed, and a second embossed portion 82 which provides the corresponding surface of the haptics of the same lens. These embossed portions 80, 82 are formed on one of the opposite surfaces of the base plate 78. The molding 76 further includes a third embossed portion 84 which provides the other surface of the optic of the intraocular lens and which is formed on the other surface of the base plate 78. The thus obtained molding 76 is machined in the next step so that an outer peripheral portion of the base plate 78 on one side of the second embossed portion 82 is removed or trimmed from the molding 76, along the one-dot chain lines as indicated in FIG. 16, so as to form the overall shape of a desired convex-convex intraocular lens to be obtained as a final product.

Figure 14:
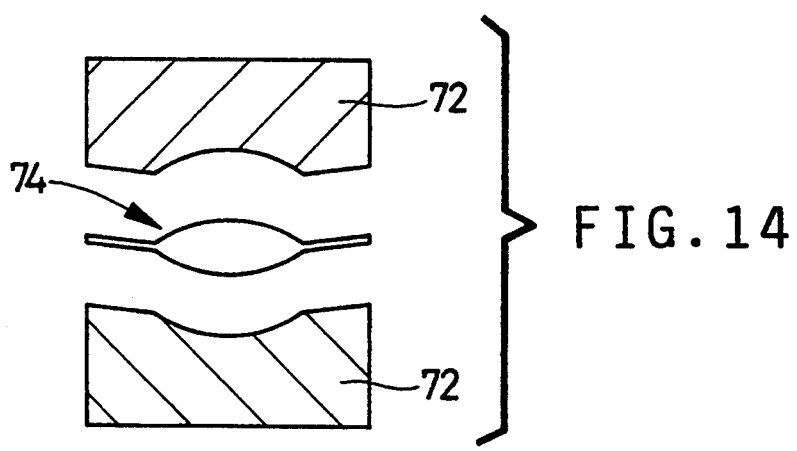
FIG. 14 is a cross sectional view showing a pair of dies for forming a convex-convex optic of an intraocular lens.
Figure 15:
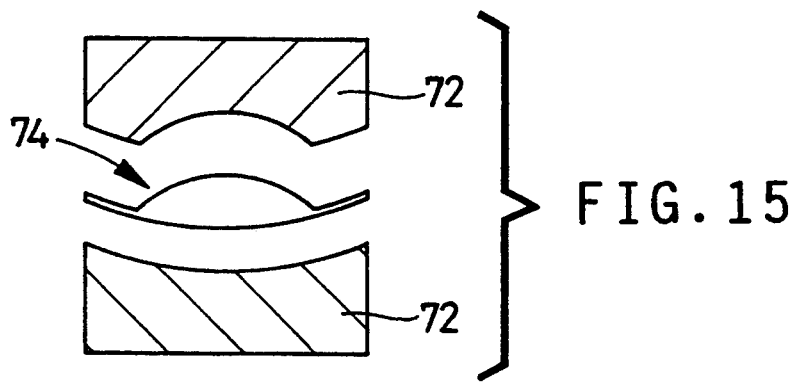
FIG. 15 is a cross sectional view showing another pair of dies for forming a convex-convex optic of an intraocular lens.

The overall shape of the integrally formed intraocular lens produced according to the present method can be changed as desired by changing the engraved pattern or patterns formed in the die or dies used for the hot press molding operation. For example, the optic of the intraocular lens may be formed in meniscus shape or other shape, other than in the plano-convex shape and convex-convex shape as described above. As shown in FIGS. 14 and 15 by way of example, a molding .74 is formed by pressing the molding material between a pair of dies 72, 72 which have mutually facing molding surfaces both having engraved patterns. The upper die 72 is secured to the lower surface of the upper punch 14 of the hot press device as shown in FIG. 1.

While the haptic or lens support of the intraocular lens as shown in FIG. 9 consists of C-shaped loops which extend in a direction perpendicular to the axis of the optical portion, the haptic may consist of three or more C-shaped loops or other types of loops, such as J-shaped loops. When the molding 74 is formed by using the dies 72 as shown in FIG. 14, a radially outer portion or annular flange of the molding 74, which gives the haptic of the lens, is formed to be inclined with respect to the plane perpendicular to the axis of the optic. When the dies 72 as shown in FIG. 15 are used, a radially outer portion or annular flange of the molding 74, which gives the haptic of the lens, forms a part of a curved surface which includes one lens surface of the optic. Thus, the haptic of the intraocular lens as obtained by machining the molding may form a suitable angle with respect to the lens surface or may extend in a curved form to provide a part of the lens surface.

EXAMPLES

To further clarify the concept of the present invention, there will be described some typical examples of the method of producing an intraocular lens according to the present invention. However, it is to be understood that the invention is by no means limited to the details of these examples, but may be embodied with various other changes, modifications and improvements which may occur to those skilled in the art, without departing from the spirit and scope of the present invention.

Example 1

Figure 6A:
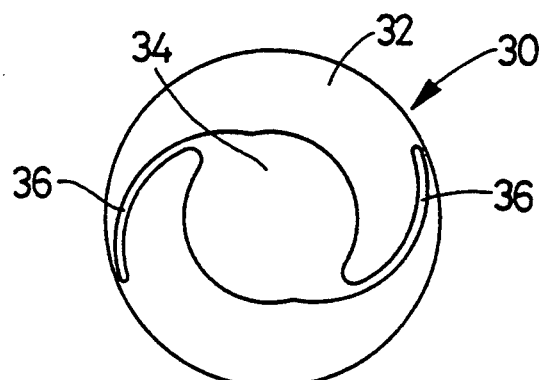
FIGS. 6A and FIG. 6B are a plan view and a front view showing the molding formed by using the die of FIG. 2.
Figure 6B:
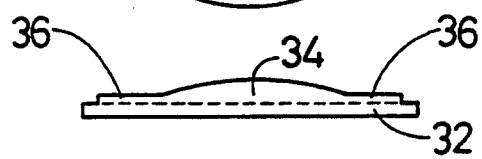

Initially, a powdered polyimide material (whose glass transition temperature is about 220° C.) having a repeated unit as indicated below was prepared and passed through a 16-mesh sieve so as to remove particles whose size is 1 mm or greater. The thus prepared powder was placed on a die (16) as shown in FIGS. 2 and 4 which is installed in a hot press device as shown in FIG. 1, and subjected to preliminary press molding for one minute at a pressure of 289 kgf/cm$^2$ and a temperature of 25° C. Thereafter, the polyimide powder material was hot pressed for 20 minutes at a temperature of 360° C. and a pressure of 289 kgf/cm$^2$, and then slowly cooled over 15 minutes at a pressure of 289 kgf/cm$^2$. Subsequently, the obtained molding was removed from the die, and then subjected to heat treatment for 15 minutes at 250° C. (to which it took 1 hour to raise the temperature), whereby a molding 30 as shown in FIG. 6 was obtained. In the next machining step, the base plate 32 on the side of the planar surface of the molding 30 was removed by cutting and polishing with use of a diamond cutting tool. Thus, there was obtained a desired integrally formed intraocular lens which has no strains and assures excellent transparency.

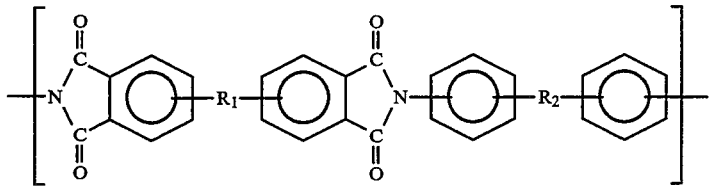

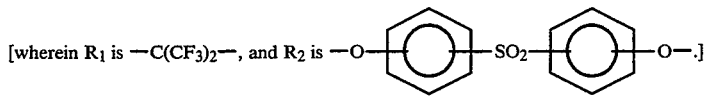

As a comparative example, an intraocular lens was produced by hot pressing a powdered polyimide material which was not passed through the sieve as described above, that is, which contained particles having 1 mm or larger size. As a result, great strains were recognized in the intraocular lens obtained, and the strains were not completely removed even if the intraocular lens was heated at 250° C.

Example 2

The powdered polyimide material as obtained in EXAMPLE 1, which excludes particles having 1 mm or larger size, was further passed through a 32-mesh sieve, so as to exclude particles having 0.5 mm or large size. The thus prepared polyimide powder was then hot pressed between the die 16 and the punch 14 in the same manner as in EXAMPLE 1, without being subjected to preliminary molding. As a result, a molding (30) having no strains and good transparency was obtained. In the next step, the molding was machined so as to provide a desired polyimide intraocular lens having good optical properties.

As a comparative example, an intraocular lens made of polyimide was produced in the same manner as in EXAMPLE 1, except that the polyimide powder as described above was hot pressed for 10 min. at a pressure of 200 kgf/cm² and a temperature of 390° C. Although no strains were recognized in the obtained intraocular lens, the lens as a whole was largely colored. When the hot press molding was effected for 40 minutes at 320° C. under 300 kgf/cm², the obtained intraocular lens included opaque portions in which the polyimide powder had not been completely fused.

What is claimed is:

1. A method of producing an intraocular lens having an optic, and a haptic for holding the lens in position within an eye, the optic and the haptic being formed integrally with each other, comprising the steps of:

preparing a polyimide powder having a repeated unit represented by the following formula:

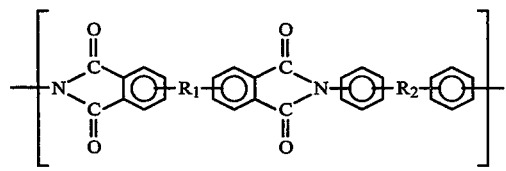

[in the formula, when $R_1 = -C(CF_3)_2-$, $R_2$ is selected from $-SO_2-$, $-O-$,

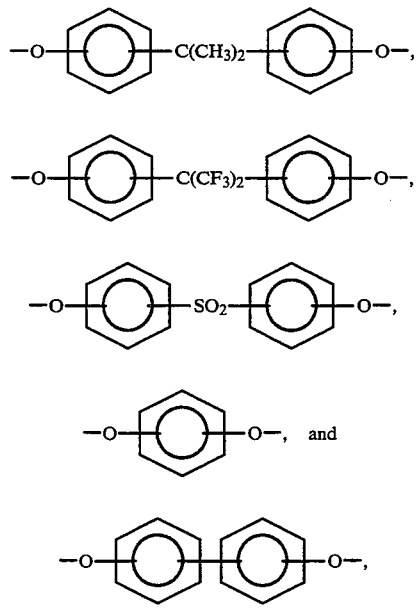

and when $R_1 = -SO_2-$ or $-O-$, $R_2$ is $-C(CF_3)_2-$

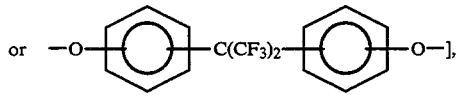

said polyimide powder having a particle size of less than 1 mm;

placing a polyimide material consisting of said polyimide powder between a pair of dies having opposed molding surfaces, one of which has an engraved pattern corresponding to a contour of one surface of the optic of the intraocular lens and a contour of one surface of the haptic of the lens;

hot pressing said polyimide material between said pair of dies, to provide a molding having a base plate, and a first and a second embossed portion formed on the base plate, said first embossed portion and said second embossed portion being configured to provide said one surface of the optic and said one surface of the haptic, respectively; and machining said molding so as to remove said base plate, to thereby form a surface opposite to said one surface of the optic and said one surface of the haptic, which surface cooperates with said first and second embossed portions to provide an overall shape of the intraocular lens.

2. A method of producing an intraocular lens according to claim 1, wherein the step of machining said molding comprises cutting and polishing the molding so as to remove said base plate.

3. A method of producing an intraocular lens according to claim 1, wherein the particle size of said polyimide powder is less than 0.5 mm.

4. A method of producing an intraocular lens according to claim 1, wherein said polyimide powder is hot pressed at a temperature which is 110° C. to 160° C. higher than a glass transition temperature of the polyimide powder.

5. A method of producing an intraocular lens according to claim 1, further comprising the step of preliminarily pressing said polyimide material at room temperature under a pressure of 100~400 kgf/cm², prior to hot pressing of the polyimide material.

6. A method of producing an intraocular lens according to claim 1, further comprising the step of slowly cooling said molding after hot pressing of the polyimide material.

7. A method of producing an intraocular lens according to claim 1, further comprising the step of heat treating said molding at a temperature between a fusing temperature and a glass transition temperature of the polyimide powder.

8. A method of producing an intraocular lens having an optic, and a haptic for holding the lens in position within an eye, the optic and the haptic being formed integrally with each other, comprising the steps of:

preparing a polyimide powder having a repeated unit represented by the following formula:

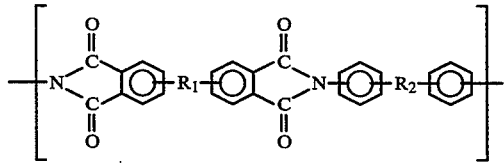

[in the formula, when $R_1 = -C(CF_3)_2-$, $R_2$ is selected from $-SO_2-$, $-O-$,

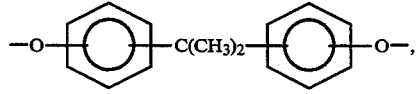

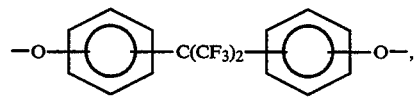

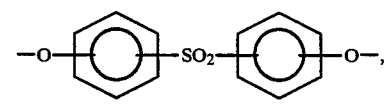

-continued

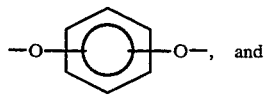, and

, and when $R_1 = -SO_2-$ or $-O-$, $R_2$ is $-C(CF_3)_2-$ or 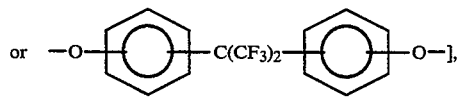], said polyimide powder having a particle size of less than 1 mm;

placing a polyimide material consisting of said polyimide powder between a pair of dies having opposed molding surfaces, one of which has an engraved pattern corresponding to a contour of one surface of the optic of the intraocular lens and a contour of one surface of the haptic of the lens, and the other of which has an engraved pattern corresponding to a contour of the other surface of the optic of the lens;

hot pressing said polyimide material between said pair of dies, to provide a molding having a base plate, a first and a second embossed portion formed on one surface of the base plate and configured to provide said one surface of the optic and said one surface of the haptic, respectively, and a third embossed portion formed on the other surface of the base plate and configured to provide said other surface of the optic; and machining said molding so as to remove a part of said base plate, so that said first and second embossed portions cooperate with said third embossed portion to provide an overall shape of the intraocular lens.

9. A method of producing an intraocular lens according to claim 8, wherein the step of machining said molding comprises cutting and polishing the molding so as to remove said base plate.

10. A method of producing an intraocular lens according to claim 8, wherein the particle size of said polyimide powder is less than 0.5 mm.

11. A method of producing an intraocular lens according to claim 8, wherein said polyimide powder is hot pressed at a temperature which is 110° C. to 160° C. higher than a glass transition temperature of the polyimide powder.

12. A method of producing an intraocular lens according to claim 8, further comprising the step of preliminarily pressing said polyimide material at room temperature under a pressure of 100~400 kgf/cm², prior to hot pressing of the polyimide material.

13. A method of producing an intraocular lens according to claim 8, further comprising the step of slowly cooling said molding after hot pressing of the polyimide material.

14. A method of producing an intraocular lens according to claim 8, further comprising the step of heat treating said molding at a temperature between a fusing temperature and a glass transition temperature of the polyimide powder.

15. A method of producing an intraocular lens having an optic, and a haptic for holding the lens in position within an eye, the optic and the haptic being formed integrally with each other, comprising the steps of:

preparing a polyimide powder having a repeated unit represented by the following formula:

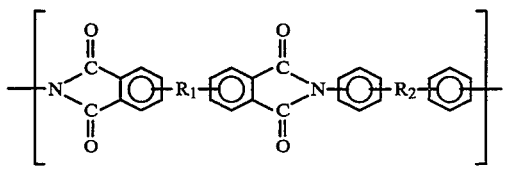

[in the formula, when $R_1 = -C(CF_3)_2-$, $R_2$ is selected from

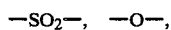

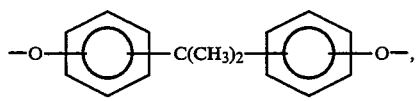

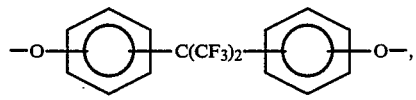

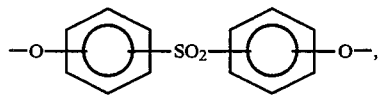

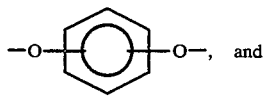

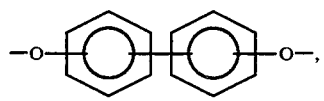

and when $R_1 = -SO_2-$ or $-O-$, $R_2$ is $-C(CF_3)_2-$

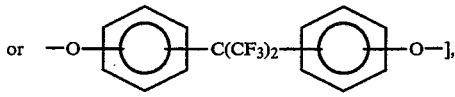

said polyimide powder having a particle size of less than 1 mm;

placing a polyimide material consisting of said polyimide powder between a pair of dies having opposed molding surfaces, at least one of which has an engraved pattern corresponding to a contour of the optic of the intraocular lens;

hot pressing said polyimide material between said pair of dies, to provide a molding having a central portion which gives the optic of the lens and an annular flange surrounding the central portion and having the same thickness as the haptic of the lens, said annular flange being formed integrally with the optic; and machining said molding so as to form the haptic of the lens out of said annular flange of the molding, to thereby provide an overall shape of the intraocular lens wherein the haptic extends integrally from the optic.

16. A method of producing an intraocular lens according to claim 15, wherein the step of machining said molding is effected by one of laser beam machining, punching, and hollowing by an engraving machine.

17. A method of producing an intraocular lens according to claim 15, wherein the particle size of said polyimide powder is less than 0.5 mm.

18. A method of producing an intraocular lens according to claim 15, wherein said polyimide powder is hot pressed at a temperature which is 110° C. to 160° C. higher than a glass transition temperature of the polyimide powder.

19. A method of producing an intraocular lens according to claim 15, further comprising the step of preliminarily pressing said polyimide material at room temperature under a pressure of 100~400 kgf/cm², prior to hot pressing of the polyimide material.

20. A method of producing an intraocular lens according to claim 15, further comprising the step of slowly cooling said molding after hot pressing of the polyimide material.

21. A method of producing an intraocular lens according to claim 15, further comprising the step of heat treating said molding at a temperature between a fusing temperature and a glass transition temperature of the polyimide powder.

22. A method of producing an intraocular lens having an optic, and a haptic for holding the lens in position within an eye, the optic and the haptic being formed integrally with each other, comprising the steps of:

preparing a polyimide powder having a repeated unit represented by the following formula:

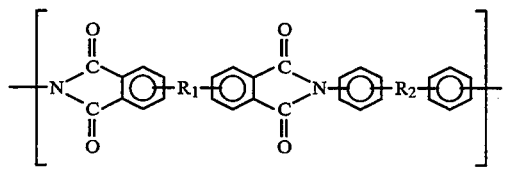

[in the formula, when $R_1 = -C(CF_3)_2-$, $R_2$ is selected from

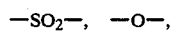

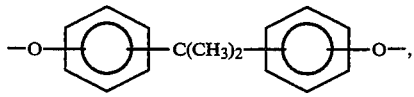

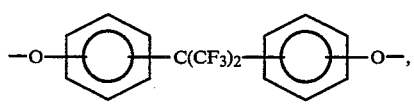

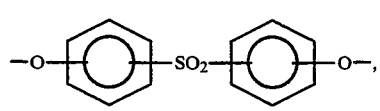

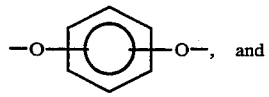, and

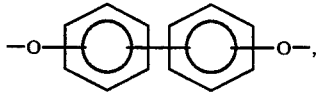, and when $R_1 = -SO_2-$ or $-O-$, $R_2$ is $-C(CF_3)_2-$ or 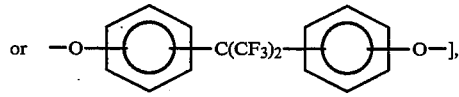], said polyimide powder having a particle size of less than 1 mm;

placing a polyimide material consisting of said polyimide powder between a pair of dies having opposed molding surfaces, at least one of which has an engraved pattern corresponding to a part of the contour of the intraocular lens;

hot pressing said polyimide material between said pair of dies, to provide a molding having said part of the contour of the intraocular lens; and machining said molding to form the rest of the contour of the intraocular lens to thereby provide an overall shape of the lens.

23. A method according to claim 1, wherein said step of preparing a polyimide powder comprises removing particles of said polyimide powder whose size is not less than 1 mm.

24. A method according to claim 8, wherein said step of preparing a polyimide powder comprises removing particles of said polyimide powder whose size is not less than 1 mm.

25. A method according to claim 15, wherein said step of preparing a polyimide powder comprises removing particles of said polyimide powder whose size is not less than 1 mm.

26. A method according to claim 22, wherein said step of preparing a polyimide powder comprises removing particles of said polyimide powder whose size is not less than 1 mm.

27. A method of producing an intraocular lens having an optic, and a haptic for holding the lens in position within an eye, the optic and the haptic being formed integrally with each other, comprising the steps of:

preparing a polyimide powder having a particle size less than 1 mm and a repeated unit represented by the following formula:

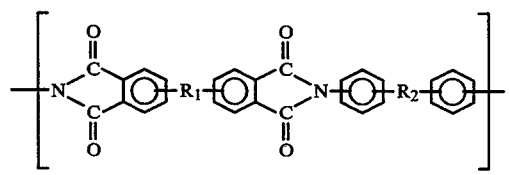

wherein, when $R_1 = -C(CF_3)_2-$, $R_2$ is selected from $-SO_2-$, $-O-$,

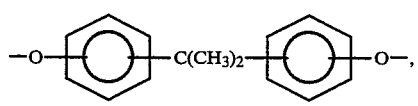,

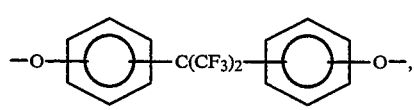,

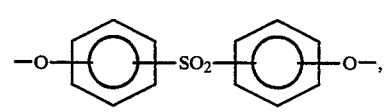,

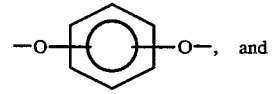, and

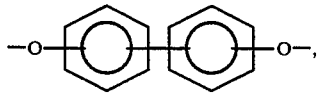, and when $R_1 = -SO_2-$ or $-O-$, $R_2$ is $-C(CF_3)_2-$ or 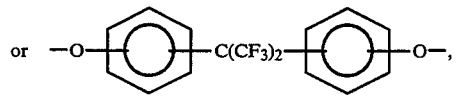, by removing particles of said polymide powder whose size is less than 1 mm;

placing a polyimide material consisting of said polyimide powder between a pair of dies having opposed molding surfaces, one of which has an engraved pattern corresponding to a contour of one surface of the optic of the intraocular lens and a contour of one surface of the haptic of the lens;

hot pressing said polyimide material between said pair of dies, to provide a molding having a base plate, and a first and a second embossed portion formed on the base plate, said first embossed portion and said second embossed portion being configured to provide said one surface of the optic and said one surface of the haptic, respectively;

heat treating said molding at a temperature between a fusing temperature and a glass transition temperature of the polyimide powder; and machining said molding so as to remove said base plate, to thereby form a surface opposite to said one surface of the optic and said one surface of the haptic, which surface cooperates with said first and second embossed portions to provide an overall shape of the intraocular lens.

28. A method of producing an intraocular lens having an optic, and a haptic for holding the lens in position within an eye, the optic and the haptic being formed integrally with each other, comprising the steps of:

preparing a polyimide powder having a particle size less than 1 mm and a repeated unit represented by the following formula:

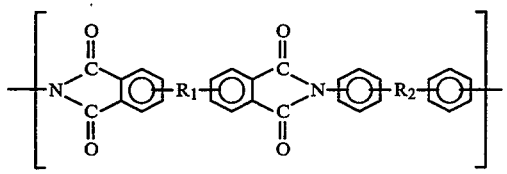

wherein, when $R_1 = -C(CF_3)_2-$, $R_2$ is selected from $-SO_2-$, $-O-$,

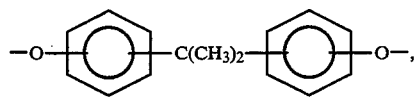

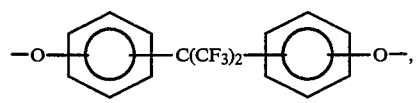

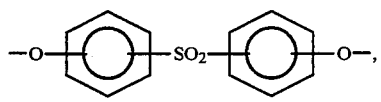

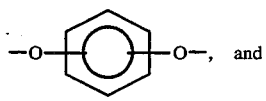 and

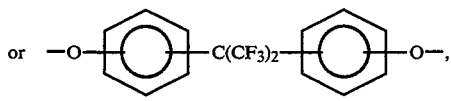

and when $R_1 = -SO_2-$ or $-O-$, $R_2$ is $-C(CF_3)_2-$ or 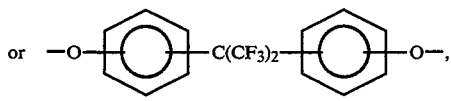

by removing particles of said polymide powder whose size is less than 1 mm;

placing a polyimide material consisting of said polyimide powder between a pair of dies having opposed molding surfaces, one of which has an engraved pattern corresponding to a contour of one surface of the optic of the intraocular lens and a contour of one surface of the haptic of the lens, and the other of which has an engraved pattern corresponding to a contour of the other surface of the optic of the lens;

hot pressing said polyimide material between said pair of dies, to provide a molding having a base plate, a first and a second embossed portion formed on one surface of the base plate and configured to provide said one surface of the optic and said one surface of the haptic, respectively, and a third embossed portion formed on the other surface of the base plate and configured to provide said other surface of the optic;

heat treating said molding at a temperature between a fusing temperature and a glass transition temperature of the polyimide powder; and machining said molding so as to remove a part of said base plate, so that said first and second embossed portions cooperate with said third embossed portion to provide an overall shape of the intraocular lens.

29. A method of producing an intraocular lens having an optic, and a haptic for holding the lens in position within an eye, the optic and the haptic being formed integrally with each other, comprising the steps of:

preparing a polyimide powder having a particle size less than 1 mm and a repeated unit represented by the following formula:

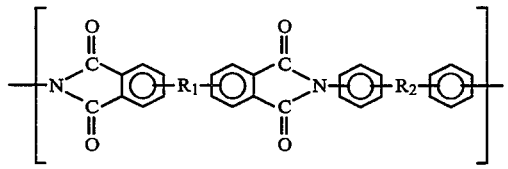

wherein, when $R_1 = -C(CF_3)_2-$, $R_2$ is selected from $-SO_2-$, $-O-$,

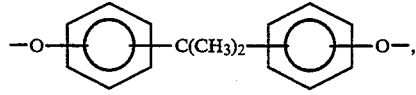

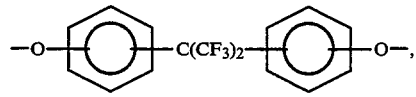

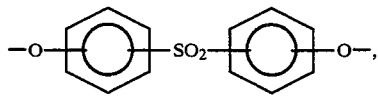

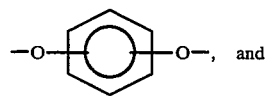, and

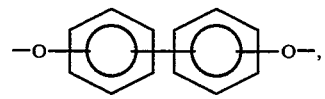

and when $R_1 = -SO_2-$ or $-O-$, $R_2$ is $-C(CF_3)_2-$ or 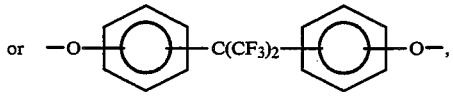

by removing particles of said polymide powder whose size is less than 1 mm;

placing a polyimide material consisting of said polyimide powder between a pair of dies having opposed molding surfaces, at least one of which has an engraved pattern corresponding to a contour of the optic of the intraocular lens;

hot pressing said polyimide material between said pair of dies, to provide a molding having a central portion which gives the optic of the lens and an annular flange surrounding the central portion and having the same thickness as the haptic of the lens, said annular flange being formed integrally with the optic;

heat treating said molding at a temperature between a fusing temperature and a glass transition temperature of the polyimide powder; and machining said molding so as to form the haptic of the lens out of said annular flange of the molding, to thereby provide an overall shape of the intraocular lens wherein the haptic extends integrally from the optic.

* * * * *